(12) United States Patent
Aher et al.

(10) Patent No.: US 11,715,466 B2
(45) Date of Patent: Aug. 1, 2023

(54) SYSTEMS AND METHODS FOR LOCAL INTERPRETATION OF VOICE QUERIES

(71) Applicant: Rovi Guides, Inc., San Jose, CA (US)

(72) Inventors: Ankur Anil Aher, Kalyan (IN); Kiran Das B, Mysore (IN); Jyothi Ekambaram, Bangalore (IN); Nishchit Mahajan, Amritsar (IN)

(73) Assignee: Rovi Guides, Inc., San Jose, CA (US)

( * ) Notice: Subject to any disclaimer, the term of this patent is extended or adjusted under 35 U.S.C. 154(b) by 563 days.

(21) Appl. No.: 16/690,400

(22) Filed: Nov. 21, 2019

(65) Prior Publication Data

US 2021/0158807 A1 May 27, 2021

(51) Int. Cl.
*G10L 15/22* (2006.01)
*G10L 15/30* (2013.01)
*G10L 15/26* (2006.01)
*H04M 1/725* (2021.01)

(52) U.S. Cl.
CPC .............. *G10L 15/22* (2013.01); *G10L 15/26* (2013.01); *G10L 15/30* (2013.01); *G10L 2015/223* (2013.01); *H04M 1/725* (2013.01)

(58) Field of Classification Search
CPC ... G10L 15/30; G10L 2015/223; G10L 15/10; G10L 15/26; G10L 15/22; H04M 1/725; H04M 1/724; H04M 2250/74; G06F 3/167; H04L 45/02; H04L 45/021; H04L 45/04; H04L 45/245; H04L 45/32; H04L 45/44; H04L 45/566
See application file for complete search history.

(56) References Cited

U.S. PATENT DOCUMENTS

| | | | | |
|---|---|---|---|---|
| 4,862,498 | A | * | 8/1989 | Reed ........................ H04M 3/44 379/355.09 |
| 7,849,263 | B1 | * | 12/2010 | French .................... G06F 3/0685 711/170 |
| 2003/0110031 | A1 | * | 6/2003 | Menendez-Pidal ..... G10L 15/10 704/240 |
| 2019/0206388 | A1 | * | 7/2019 | Aggarwal ............... G10L 15/30 |
| 2020/0227039 | A1 | * | 7/2020 | Liu .......................... H04R 3/005 |

* cited by examiner

*Primary Examiner* — Angela A Armstrong
(74) *Attorney, Agent, or Firm* — Haley Guiliano LLP

(57) ABSTRACT

Systems and methods are described herein for locally interpreting a voice query and for managing a storage size of data stored locally to support such local interpretation of voice queries. A voice query is received and compared with a plurality of stored voice queries having similar audio characteristics. If a match is identified, text corresponding to the matching stored voice query is retrieved, and an action corresponding to the retrieved text is performed. If the locally stored table does not contain a stored voice query that matches the voice query, the voice query is transmitted to a remote server for transcription. Once the transcription is received from the remote server, the voice query and the transcription are stored in the table in association with one another.

16 Claims, 8 Drawing Sheets

|  | 200 ↘ | 202 | 210 | 212 |
|---|---|---|---|---|
|  |  | Query Text | Query Frequency | Last Access Time |
| 204 → |  | volume up | 33 | Sep 25 2019 17:36 UTC |
| 206 → |  | open Netflix | 26 | Sep 26 2019 21:40 UTC |
| 208 → |  | play Game of Thrones | 12 | Sep 05 2019 07:43 UTC |

FIG. 2

| | 302 Query Text | Audio File (312) | Audio File Details — Duration (ms) (314) | # of Matches (316) | Last Match Time (318) |
|---|---|---|---|---|---|
| 304 | volume up | 320a volumeup_1.wav | 322a 495 | 324a 15 | 326a Sep 24 2019 13:14 UTC |
|  |  | 320b volumeup_2.wav | 322b 586 | 324b 10 326b | Sep 01 2019 15:53 UTC |
|  |  | 320c volumeup_3.wav | 322c 531 | 324c 8 326c | Aug 11 2019 09:37 UTC |
| 306 | open Netflix | opennetflix_1.wav | 915 | 6 | Feb 23 2019 21:40 UTC |
|  |  | opennetflix_2.wav | 984 | 10 | Sep 22 2019 18:06 UTC |
|  |  | opennetflix_3.wav | 897 | 9 | Jul 30 2019 12:41 UTC |
|  |  | opennetflix_4.wav | 1003 | 1 | May 04 2019 01:07 UTC |
| 308 | play Game of Thrones | playgameofthrones_1.wav | 1304 | 8 | Jun 17 2019 20:05 UTC |
|  |  | playgameofthrones_2.wav | 1251 | 4 | Jun 11 2019 21:26 UTC |

FIG. 3

SYSTEMS AND METHODS FOR LOCAL INTERPRETATION OF VOICE QUERIES

BACKGROUND

The disclosure relates to voice control systems and, in particular, implementations of voice control systems in low bandwidth environments.

SUMMARY

With the proliferation of personal electronic devices, such as smartphones and tablets, there has been an increase in the use of voice control systems that allow users to interact with various functions using voice commands. As the number of functions that can be controlled through voice commands expands, more and more words need to be recognized by the voice control system in order to affect the proper response to the voice command. Voice control systems recognizing only a few simple words can locally store data required to understand those specific words. Most current voice control systems, however, enable recognition of any spoken word, and cannot locally store all data needed to understand all words. Instead, such systems transmit the voice command to a remote server for transcription. This requires that the device at which the voice command is received have a network connection, and that the network connection have sufficient bandwidth to transmit the entire voice command to the remote server. As voice commands become more complex, the length of voice commands increases, and with it, the bandwidth needed to transmit the voice command to the remote server. Additionally, the remote server is often operated by a third party that charges fees for processing queries. As the complexity of voice commands increases, the number of queries that need to be processed by third-party servers, and therefore the amount of fees owed to third parties, increases. Thus, a system is needed that can reduce the amount of data needed to be transmitted to the remote service while storing only a limited amount of data on the local device.

Systems and methods are described herein for locally interpreting a voice query and for managing a storage size of data stored locally to support such local interpretation of voice queries. A voice query is received, and audio characteristics of the voice query are determined. A plurality of stored voice queries having similar audio characteristics are retrieved from a locally stored table. The voice query is compared with each of the retrieved stored voice queries. If a match is identified, text corresponding to the matching stored voice query is retrieved, and an action corresponding to the retrieved text is performed. If the locally stored table does not contain a stored voice query that matches the voice query, the voice query is transmitted to a remote server for transcription. Once the transcription is received from the remote server, the voice query and the transcription are stored in the table in association with one another.

To determine whether a stored voice query matches the received voice query, several audio characteristics may be compared. For example, the duration of the voice query may be compared with the duration of each stored voice query. In some embodiments, audio analysis of the voice query is performed to identify audio characteristics of the voice query such as tone, rhythm, cadence, and accent. The locally stored table may also include metadata describing these same audio characteristics of each stored voice query. The audio characteristics determined by the audio analysis may be compared with the metadata describing each stored voice query to determine if there is a match.

The frequency of receipt of each voice query may be tracked. For example, a counter may be maintained for each stored voice query indicating the number of times that voice query was received. A last access time representing the most recent time at which each stored voice query was received may also be maintained. Metadata representing the frequency of receipt of the stored voice query may also be maintained. The counter and/or last access time for a particular stored voice query may be updated when a matching voice query is received.

If the stored voice queries and associated metadata and counters exceeds a threshold storage size, the amount of stored data may be reduced. For example, if the frequency with which a particular stored voice query is received is below a threshold frequency, that stored voice query and all related data may be removed. As another example, if more than a threshold amount of time has passed since the last access time of a particular stored voice query, that stored voice query and all related data may be removed.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout and in which:

FIG. 2 is an exemplary data structure for tracking frequency of input of voice queries, in accordance with some embodiments of the disclosure;

FIG. 3 is an exemplary data structure containing past voice queries and associated characteristics, in accordance with some embodiments of the disclosure;

DETAILED DESCRIPTION

Figure 1:
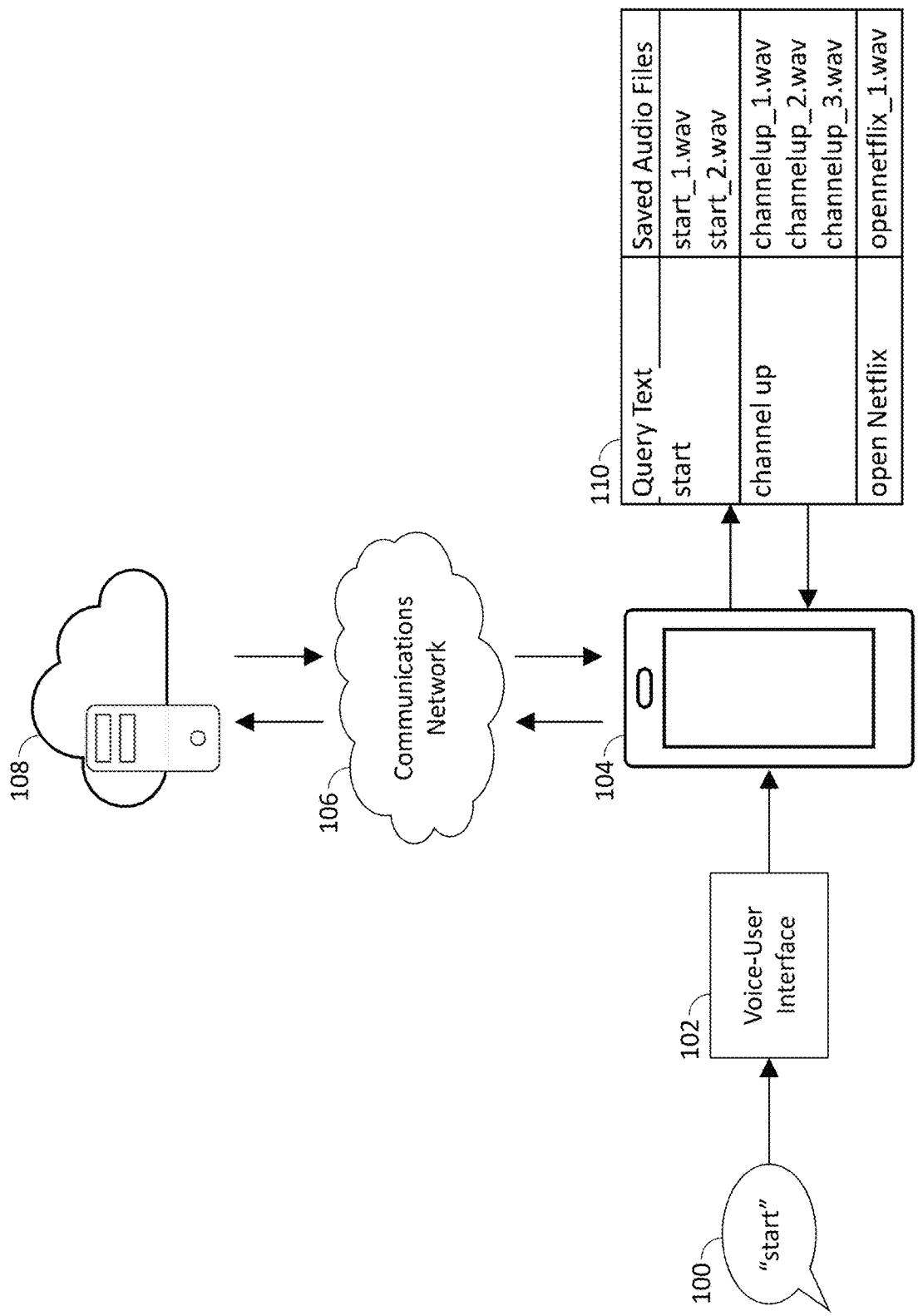
FIG. 1 shows an exemplary environment in which voice queries are received and stored in a local table, in accordance with some embodiments of the disclosure.

FIG. 1 shows an exemplary environment in which a voice query is locally interpreted, in accordance with some embodiments of the disclosure. Voice query 100 is received at voice-user interface 102. The voice query is converted at voice-user interface 102 to a signal that local device 104 can process. For example, voice-user interface may be a microphone that converts raw audio data representing the voice query to a digital audio signal for input into local device 104. Local device 104 transmits the query, via communication network 106, to server 108, where a transcription of the query is generated. Local device 104 receives the transcription back from server 108 and stores the transcription in data structure 110 for use in interpreting future voice queries. Data structure 110 includes at least one stored audio file representing each received query. When a new query is received, it can be compared against each of the stored audio files in data structure 110 to identify a corresponding transcription. Local device 104 may use audio characteristics of each saved audio file corresponding to a particular query to generate average audio characteristics for the particular query to further enhance and/or improve interpretation of future voice queries.

Local device 104 may have limited storage capacity and may not be able to store each and every query ever received. Local device 104 may track the frequency with which each query is received and/or the last time at which a received query was accessed or matched a particular saved audio file. FIG. 2 is an exemplary data structure 200 for tracking frequency of input of voice queries, in accordance with some embodiments of the disclosure. Data structure 200 includes a query text field 202. In the example of FIG. 2, three queries 204, 206, and 208 are stored in data structure 200 having texts "volume up," "open Netflix," and "play Game of Thrones," respectively. Data structure 200 also includes query frequency field 210 and last access time field 212. Query frequency field 210 contains a counter representing the number of times the particular query has been received. Last access time field 212 contains a timestamp corresponding to the most recent time at which the particular query was received. Local device 104 may store a variable representing a date and time at which local device 104 received a first voice query. Using the counter stored in query frequency field 210, local device 104 can determine a frequency with which the particular query has been received. For example, local device 104 may determine an amount of time between the time represented by the stored variable and the last access time of the particular query, and divide that amount of time by the value of the counter in the query frequency field to determine an average time between each receipt of the particular query. If the frequency of receipt of a particular query is below a threshold (for example, the average time between each receipt of the particular query exceeds a threshold amount of time), then the particular query and related data may be removed from data structure 200.

FIG. 3 is an exemplary data structure 300 containing past voice queries and associated characteristics, in accordance with some embodiments of the disclosure. Local device 104 may store audio files and metadata relating to queries previously received. As in the example of FIG. 2, data structure 300 contains stored audio files and associated metadata for three different voice queries. For each voice query 304, 306, 308, audio file details 310 are stored in data structure 300. Audio file details 310 includes an audio file field 312, a duration field 314, a number of matches field 316, and a last match time field 318. At least one audio file that has been matched with a particular query is stored in audio file field 312. For each audio file, a duration of the audio file is stored in duration field 314, and counters representing the number of times a received query matched each audio file are stored in number of matches field 316. Timestamps corresponding to the most recent time that a received query matched each audio file are stored in last access time field 318. For example, a voice command "volume up" may be received by local device 104. If no previous "volume up" query has been received, local device 104 may request transcription of the query from remote server 108. The corresponding transcription received from remote server 108 may be stored in query text field entry 304. The audio file representing the query may be stored in audio file field entry 320a. Audio files representing subsequent "volume up" queries may also be stored, for example in audio file entries 320b and 320c. The duration of each audio file may be stored in duration field entries 322a, 322b, and 322c, corresponding to audio files 320a, 320b, and 320c, respectively. Counters representing the number of times a received voice query has matched a particular audio file may be stored in number of matches field entries 324a, 324b, and 324c, corresponding to the number of times a received voice query has matched audio file 320a, 320b, or 320c, respectively. Finally, a timestamp representing a date and time at which the most recent match to each saved audio file was received may be stored in last match time field entries 326a, 326b, and 326c, corresponding to audio files 320a, 320b, and 320c, respectively.

Duration data and number of matched data may be used to speed up recognition of a received voice query. For example, the duration of a received voice query may be compared with the duration of each saved audio file to identify previous queries with similar durations. If the duration of the received voice query matches that of a saved audio file, either exactly or within a threshold duration, the saved audio file may be a candidate match for the received voice query. Alternatively or additionally, local device 104 may compare a received voice query with each saved audio file in order of number of matches, from greatest to least, relying on the statistical likelihood that the most commonly matched voice queries are the most likely candidate matches for the received voice query.

The last match time data may be used to manage the storage size of data structure 300. Local device 104 may, periodically or when the storage size of data structure 300 reaches or exceeds a threshold storage size, determine an amount of time that has passed since the last match time for each saved audio file. If the amount of time that has passed exceeds a threshold amount of time, local device 104 may remove that saved audio file and all associated data from data structure 300 to reduce the storage size of data structure 300.

Figure 4:
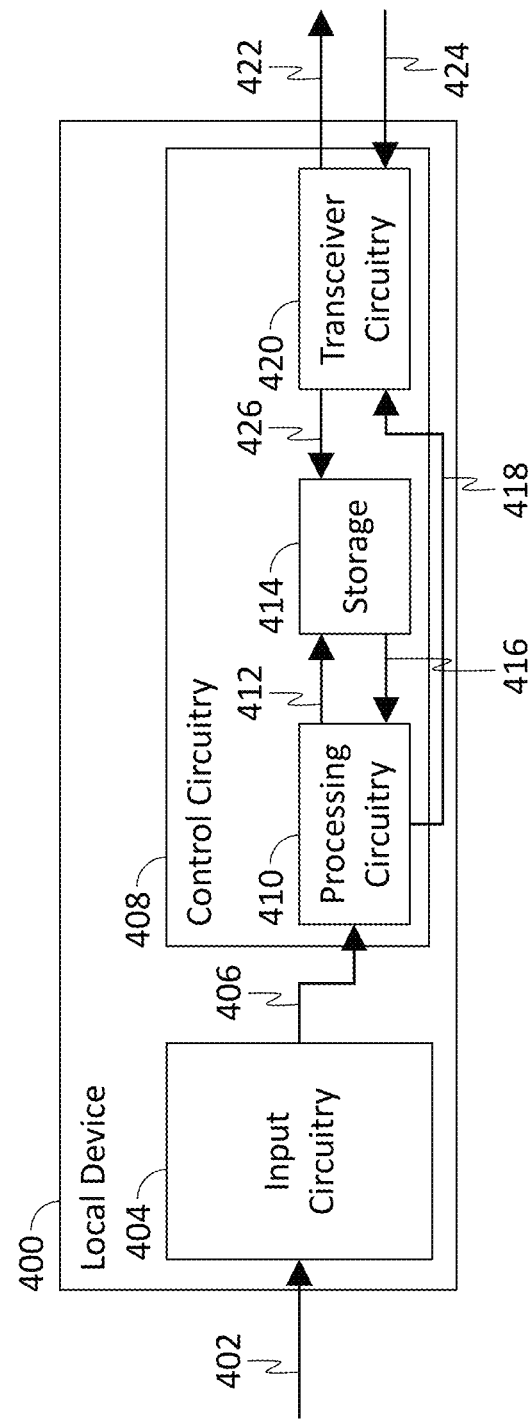
FIG. 4 is a block diagram representing components of a local device and data flow therebetween for interpreting a voice query, in accordance with some embodiments of the disclosure.

FIG. 4 is a block diagram representing components of a local device and data flow therebetween for interpreting a voice query, in accordance with some embodiments of the disclosure. Local device 400 (e.g., local device 104) receives 402 a voice query using input circuitry 404. Local device 400 may be any device for accessing media content or other types of data, such as a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other television equipment, computing equipment, or wireless device, and/or combination of the same.

The voice query may be received from a voice-user interface that is separate from local device 400, such as a microphone, voice-enabled remote control, or other audio capture device. Transmission of the voice query to local device 400 may be accomplished using a wired connection, such as an audio cable, USB cable, ethernet cable or the like attached to a corresponding input port at local device 400, or may be accomplished using a wireless connection, such as Bluetooth, WiFi, WiMax, GSM, UTMS, CDMA, TDMA, 3G, 4G, 4G LTE, or any other suitable wireless transmission protocol. Input circuitry 404 may comprise a physical input port such as a 3.5 mm audio jack, RCA audio jack, USB port, ethernet port, or any other suitable connection for receiving audio over a wired connection, or may comprise a wireless receiver configured to receive data via Bluetooth, WiFi, WiMax, GSM, UTMS, CDMA, TDMA, 3G, 4G, 4G LTE, or other wireless transmission protocols.

Once received, the query is transmitted 406 from input circuitry 404 to control circuitry 408. Control circuitry 408 may be based on any suitable processing circuitry and comprises control circuits and memory circuits, which may be disposed on a single integrated circuit or may be discrete components. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Input circuitry 404 may be integrated with control circuitry 408.

Control circuitry 408 comprises processing circuitry 410, which receives the query from input circuitry 404. Processing circuitry 410 may comprise audio conversion circuitry, natural language processing circuitry, or any other circuitry for interpreting voice queries, and may implement a local speech-to-text model. The local speech-to-text model may be a neural network model or machine learning model supplied to the local device by a remote server that is pre-trained to recognize a limited set of words corresponding to actions that the local device can perform. Processing circuitry 410 may implement a machine learning algorithm or other model for further training the local speech-to-text model to recognize additional words as needed.

The voice query may be received in a first format, such as a raw audio format or WAV file. Processing circuitry 410 may convert the query to a different format, such as MP3, M4A, WMA, or any other suitable file format. Such processing may reduce the amount of data needed to represent the audio of the query, thus reducing the amount of data needed to be transmitted to a server for transcription or stored in a local data structure, such as data structure 300.

Local device processing circuitry 410 accesses 412 a data structure (e.g., data structure 200, data structure 300) stored in storage 414. Storage 414 may be any device for storing electronic data, such as random-access memory, read-only memory, hard drives, solid state devices, quantum storage devices, or any other suitable fixed or removable storage devices, and/or any combination of the same. Local device processing circuitry 410 may query the data structure to determine if voice query 402 matches any previously received voice queries for which audio data are stored in the data structure. If so, local processing circuitry 410 receives 416 from storage 414 a response indicating a match. A counter representing the number of times the matching stored query has generally been received is incremented by one, and a last access time is updated with a timestamp corresponding to the current system time. A second counter representing the number of times the particular saved audio file on which determination of a match is based is also incremented by one, and a last match time for the particular saved audio file is updated with a timestamp corresponding to the current system time. The response may include text representing a transcription of the voice query, audio data corresponding to the voice query, an audio file representing a previously received voice query, or any other data related to the voice query. Local device processing circuitry 410 identifies, based on the response from storage 416, an action to perform in response to the voice query and performs the action.

If no match is found in the data structure, local processing circuitry 410 may receive a null response or other negative response from storage 414. In response, local device processing circuitry 410 transmits 418 audio representing voice query 402 to transceiver circuitry 420. Transceiver circuitry 420. Transceiver circuitry 420 comprises a network connection over which data can be transmitted to and received from remote devices, such as an ethernet connection, WiFi connection, or connection employing any other suitable networking protocol. Transceiver circuitry 420 transmits 422 the audio representing voice query 402 to a remote server for audio processing and transcription. Transceiver circuitry 420 then receives 424, from the remote server, a transcription of the voice query and, in some embodiments, metadata representing audio characteristics of voice query 402. Transceiver circuitry 420 transmits 426 the transcription and metadata received from the remote server to storage 414, where it is added to the data structure.

Figure 5:
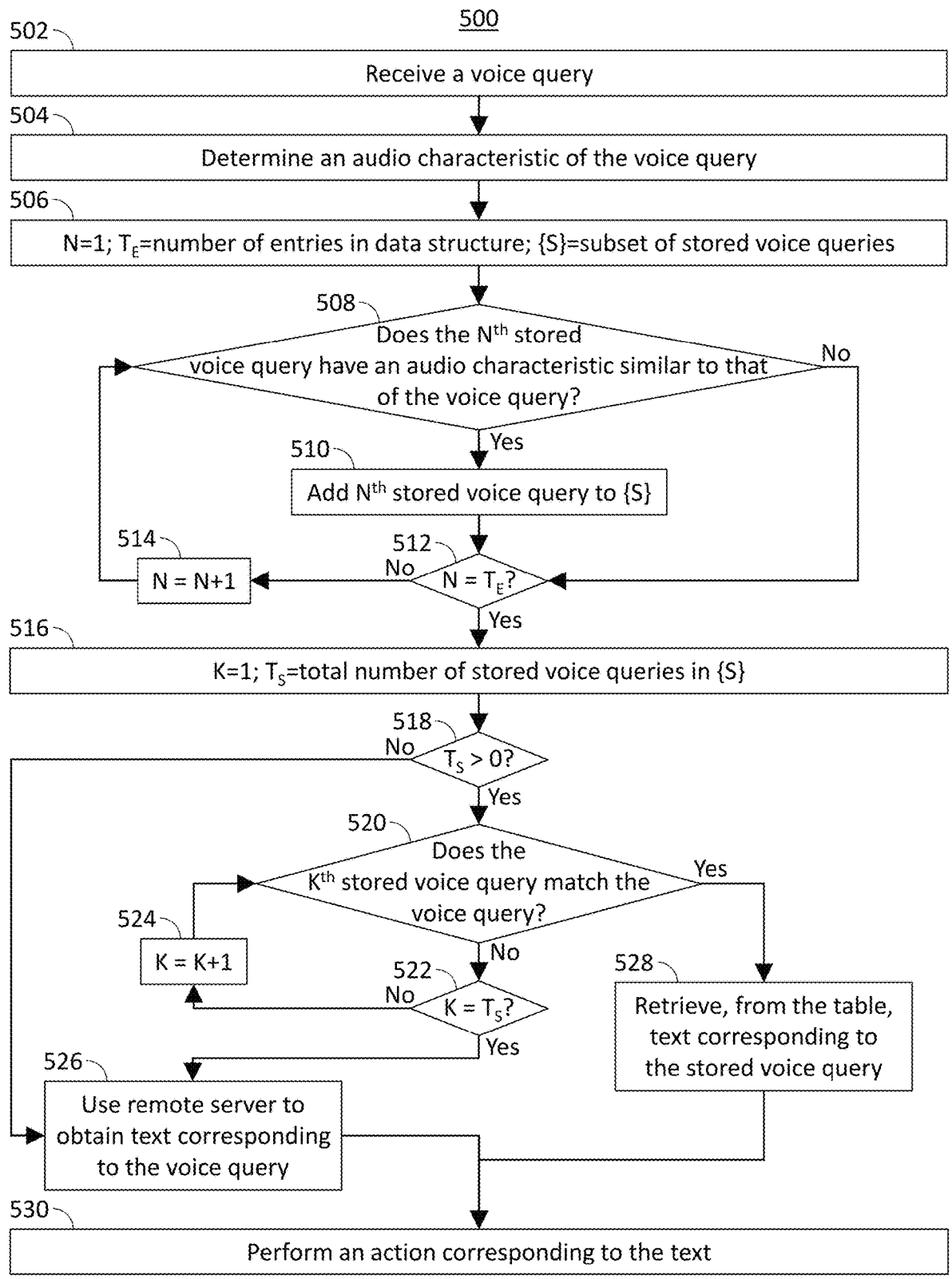
FIG. 5 is a flowchart representing a process for locally interpreting a voice query, in accordance with some embodiments of the disclosure.

FIG. 5 is a flowchart representing an illustrative process 500 for locally interpreting a voice query, in accordance with some embodiments of the disclosure. Process 500 may be implemented on local device control circuitry 408. In addition, one or more actions of process 500 may be incorporated into or combined with one or more actions of any other process or embodiment described herein.

At 502, local device 400 receives, using input circuitry 404, a voice query from a voice-user interface, such as voice-user interface 102. The voice query may be received as an analog signal from a microphone, or a digital audio signal. The digital audio signal may be raw audio data, or may be compressed, filtered, or encoded using any suitable audio compression or encoding format. At 504, local device 400, using local device processing circuitry 410 of local device control circuitry 408, determines audio characteristics of the voice query. For example, the audio received from the voice-user interface may be processed to determine the duration of the audio, the tone of the voice represented thereby, the cadence and rhythm of speech contained therein, or other audio characteristics.

At 506, local device control circuitry 408 initializes a counter variable N, setting its value to one; a variable $T_E$, representing the total number of entries in a voice query table such as data structure 200 or structure 300; and array {S} to contain a subset of stored voice queries represented in the voice query table. At 508, local device control circuitry 508 determines whether the N$^{th}$ stored voice query has an audio characteristic similar to that of the voice query. For example, local device control circuitry 408 may retrieve audio characteristics of stored audio files from the voice query table or may retrieve and process a stored audio file from the voice query table. Local device control circuitry 408 then compares audio characteristics of the N$^{th}$ stored voice query with those of the voice query. If the N$^{th}$ stored voice query has audio characteristics similar to those of the voice query, then, at 510, local device control circuitry 408 adds the N$^{th}$ stored voice query to array {S}. At 512, local device control circuitry 408 determines whether N is equal to T$_E$, meaning that the voice query has been compared with all stored voice queries. If N is not equal to T$_E$ ("No" at 512), then, at 514, local device processing circuitry 408 increments the value of N by one and processing returns to step 508.

If the voice query has been compared to all stored voice queries ("Yes" at 512), then, at 516, local device control circuitry 408 initializes another counter variable K, setting its value to one, and a variable T$_S$ representing the total number of stored voice queries in array {S}. At 518, local device control circuitry 408 determines whether the T$_S$ is greater than zero, meaning that at least one stored voice query has similar audio characteristics to those of the voice query. If so ("Yes" at 518), then, at 520, local device control circuitry 408 determines whether the K$^{th}$ stored voice query in {S} matches the voice query. For example, local device control circuitry 408, using processing circuitry 410, performs more detailed audio analyses and/or natural language processing of both the voice query and the K$^{th}$ stored voice query in {S} to determine if there is a match. If the K$^{th}$ stored voice query does not match the voice query ("No" at 520), then, at 522, local device control circuitry 408 determines whether K is equal to T$_S$, meaning that all the stored voice queries in {S} have been processed. If not ("No" at 522), then, at 524, local device control circuitry 408 increments the value of K by one, and processing returns to step 520.

If no saved voice queries were added to {S} ("No" at 518) or if no match was found after processing all stored voice queries in {S} ("Yes" at 522), then, at 526, local device control circuitry 408 uses a remote server to obtain text corresponding to the voice query. If a match is identified from the stored voice queries in {S} ("Yes" at 520), at 528, local device control circuitry 408 retrieves, from the stored voice query table, text corresponding to the K$^{th}$ stored voice query. After retrieving the text from the stored voice query table, or after receiving the text from the remote server, at 530, local device control circuitry 408 performs an action corresponding to the text.

The actions or descriptions of FIG. 5 may be used with any other embodiment of this disclosure. In addition, the actions and descriptions described in relation to FIG. 5 may be done in any suitable alternative orders or in parallel to further the purposes of this disclosure.

Figure 6:
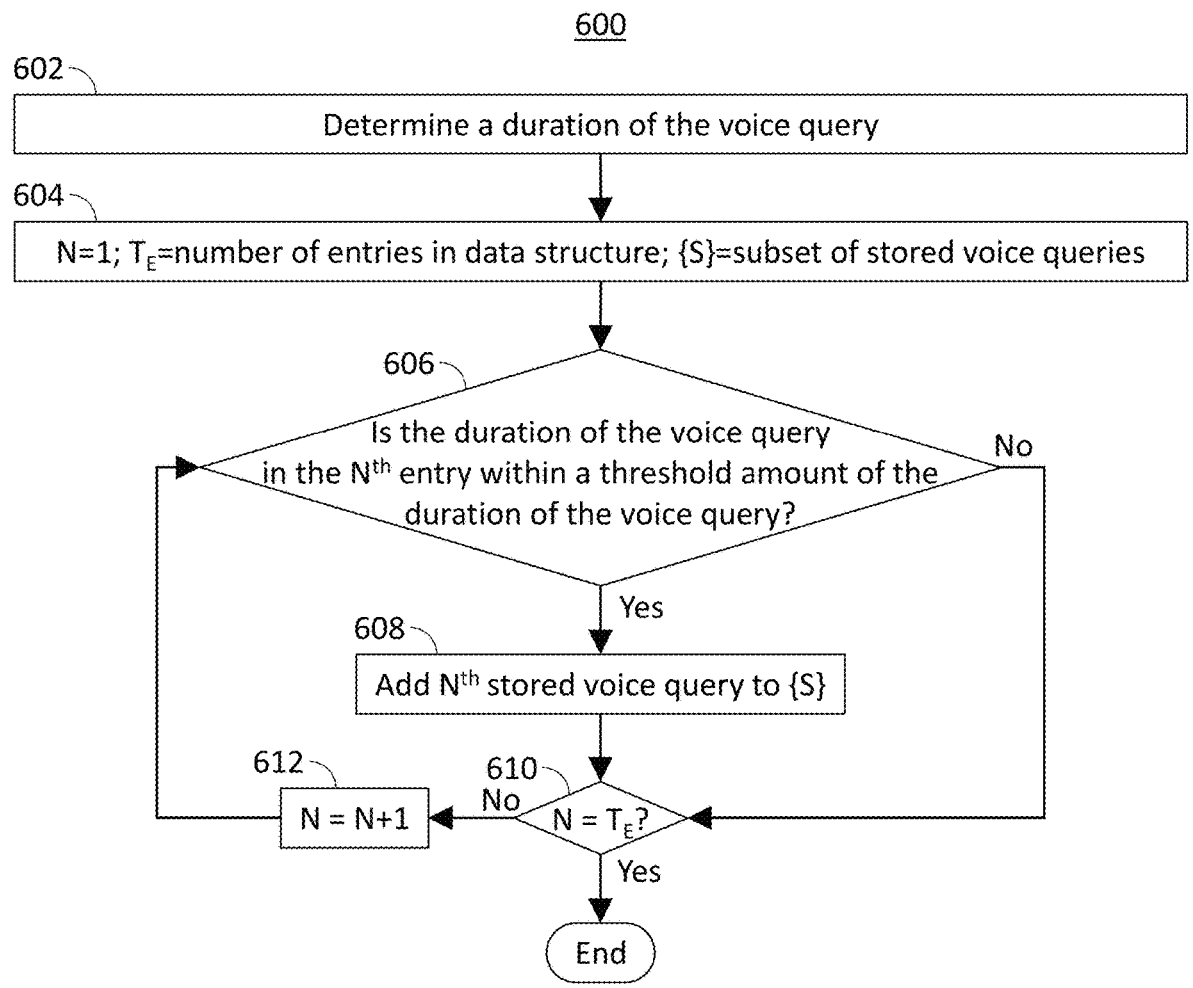
FIG. 6 is a flowchart representing a process for determining if a stored voice query has audio characteristics similar to a received voice query, in accordance with some embodiments of the disclosure.

FIG. 6 is a flowchart representing an illustrative process 600 for determining if a stored voice query has audio characteristics similar to a received voice query, in accordance with some embodiments of the disclosure. Process 600 may be implemented on local device control circuitry 408. In addition, one or more actions of process 600 may be incorporated into or combined with one or more actions of any other process or embodiment described herein.

At 602, local device control circuitry 408 determines the duration of the voice query. For example, local device control circuitry 408 may access metadata of the voice input received from the voice-user interface. The metadata may identify a duration of the audio data representing the voice query. Alternatively, the voice query may be received from the voice-user interface as part of a longer audio input. For example, the voice-user interface may require use of a wake word (e.g. "Alexa" for Amazon® Echo® devices, "Hey Google" for Google Home® devices, "Bixby" for Samsung devices, etc.). The audio representing the voice query received from the voice-user interface may include audio representing the wake word. Local device processing circuitry 408 may identify the portion of the voice query that represents the wake word and subtract its duration from the total duration of the voice query. The voice query received from the voice-user interface may, alternatively or additionally, include portions of silence before or after the voice query. Local device control circuitry 408 may identify these portions of silence (e.g., by performing audio processing to identify portions of the voice query having a volume below a threshold level across all frequencies sampled by the voice-user interface) and subtract their durations from the total duration of the voice query.

At 604, local device control circuitry 408 initializes a counter variable N, setting its value to one; a variable T$_E$ representing the total number of entries in a voice query table such as data structure 200 or structure 300; and array {S} to contain a subset of stored voice queries represented in the voice query table. At 606, local device control circuitry 408 determines whether the duration of the stored voice query in the N$^{th}$ entry in the data structure is within a threshold amount of the duration of the voice query. For example, local device control circuitry 408 may retrieve a duration for the voice query stored in the N$^{th}$ entry from a duration field in the N$^{th}$ entry and calculate the absolute value of the difference between the retrieved duration and the determined duration of the voice query. If the duration of the voice query stored in the N$^{th}$ entry is within the threshold amount of the duration of the voice query ("Yes" at 606), then, at 608, local device control circuitry 408 adds the voice query stored in the N$^{th}$ entry to array {S}. If the durations are not within the threshold amount of each other ("No" at 606), or after adding the N$^{th}$ entry to array {S}, at 610, local device control circuitry 408 determines whether N is equal to T$_E$, meaning that all the voice queries stored in the data structure have been processed. If N is not equal to T$_E$ ("No" at 610), then, at 612, local device control circuitry 408 increments the value of N by one, and processing returns to step 606. If N is equal to T$_E$ ("Yes" at 610), then the process ends.

The actions or descriptions of FIG. 6 may be used with any other embodiment of this disclosure. In addition, the actions and descriptions described in relation to FIG. 6 may be done in any suitable alternative orders or in parallel to further the purposes of this disclosure.

Figure 7:
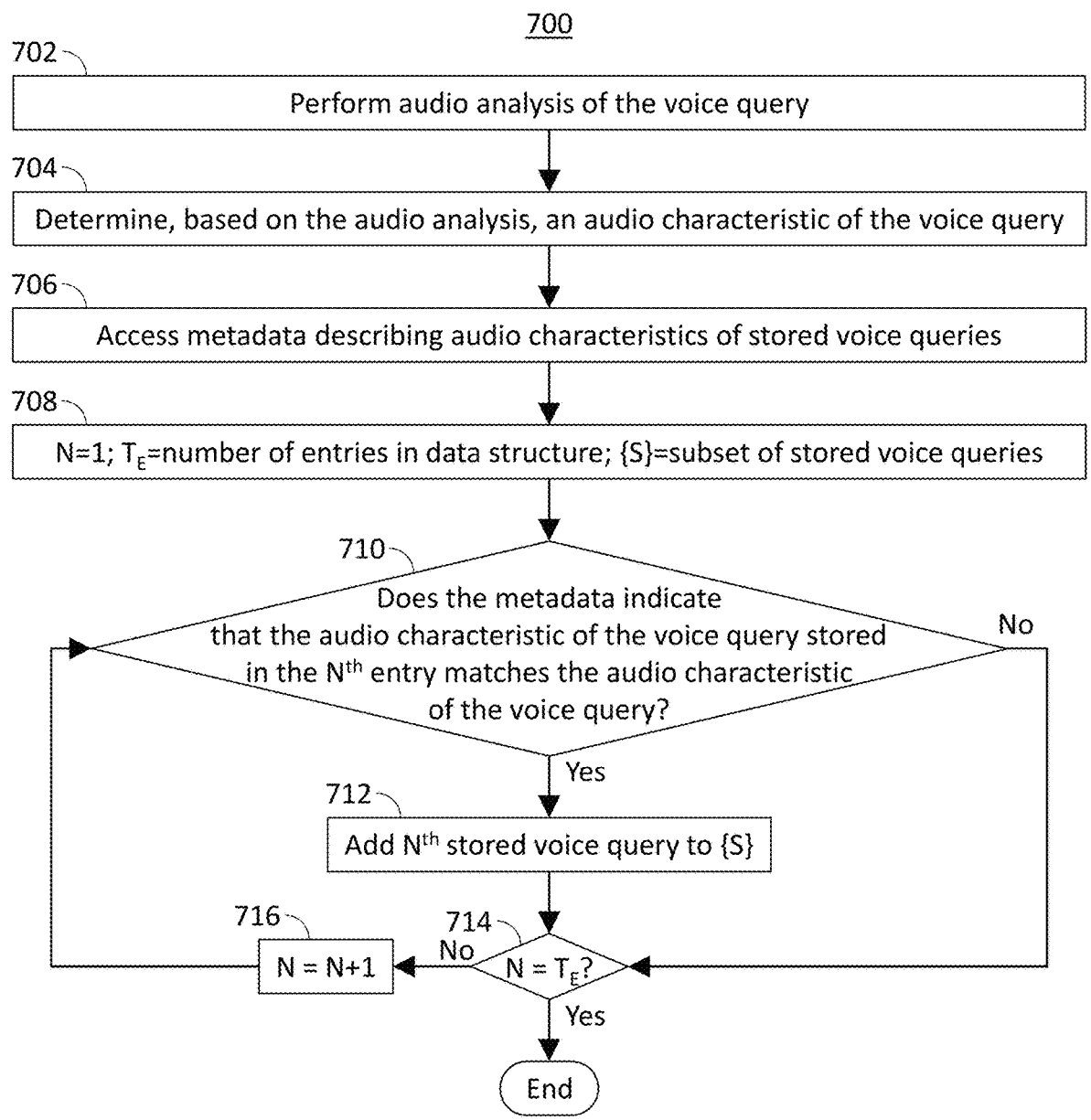
FIG. 7 is a flowchart representing another process for determining if a stored voice query has audio characteristics similar to a received voice query, in accordance with some embodiments of the disclosure.

FIG. 7 is a flowchart representing another illustrative process 700 for determining if a stored voice query has audio characteristics similar to a received voice query, in accordance with some embodiments of the disclosure. Process 700 may be implemented on local device control circuitry 408. In addition, one or more actions of process 700 may be incorporated into or combined with one or more actions of any other process or embodiment described herein.

At 702, local device control circuitry 408 performs audio analysis of the voice query. For example, local device control circuitry 408 may, using processing circuitry 410, perform frequency analysis to determine a base frequency and unique harmonic pattern of a particular voice, phoneme analysis to determine an accent of a particular voice, etc. At 704, local device control circuitry 408 determines, based on the audio analysis, an audio characteristic of the voice query, such as tone, rhythm, cadence, or accent.

At 706, local device control circuitry 408 accesses metadata describing audio characteristics of stored voice queries. For example, the data structure in which voice queries are stored may also include fields describing various audio characteristics of each stored voice query. At 708, local device control circuitry 408 increments a counter variable N, setting its value to one; a variable $T_E$ representing the total number of entries in the data structure; and array {S} to contain a subset of stored voice queries represented in the voice query table. At 710 local device control circuitry 408 determines whether the metadata indicates that the audio characteristic of the voice query stored in the $N^{th}$ entry matches the audio characteristic of the voice query. If so ("Yes" at 710), then, at 712, local device control circuitry 408 adds the voice query stored in the $N^{th}$ entry to array {S}. After adding the stored voice query to array {S}, or if the metadata does not indicate that the audio characteristic of the stored voice query matches that of the voice query ("No" a 710), at 714, local device control circuitry 408 determines whether N is equal to $T_E$, meaning that all stored voice queries have been processed. If N is not equal to $T_E$ ("No" at 714), then, at 716, local device control circuitry 408 increments the value of N by one, and processing return to step 710. If N is equal to $T_E$ ("Yes" at 714), then the process ends.

The actions or descriptions of FIG. 7 may be used with any other embodiment of this disclosure. In addition, the actions and descriptions described in relation to FIG. 7 may be done in any suitable alternative orders or in parallel to further the purposes of this disclosure.

Figure 8:
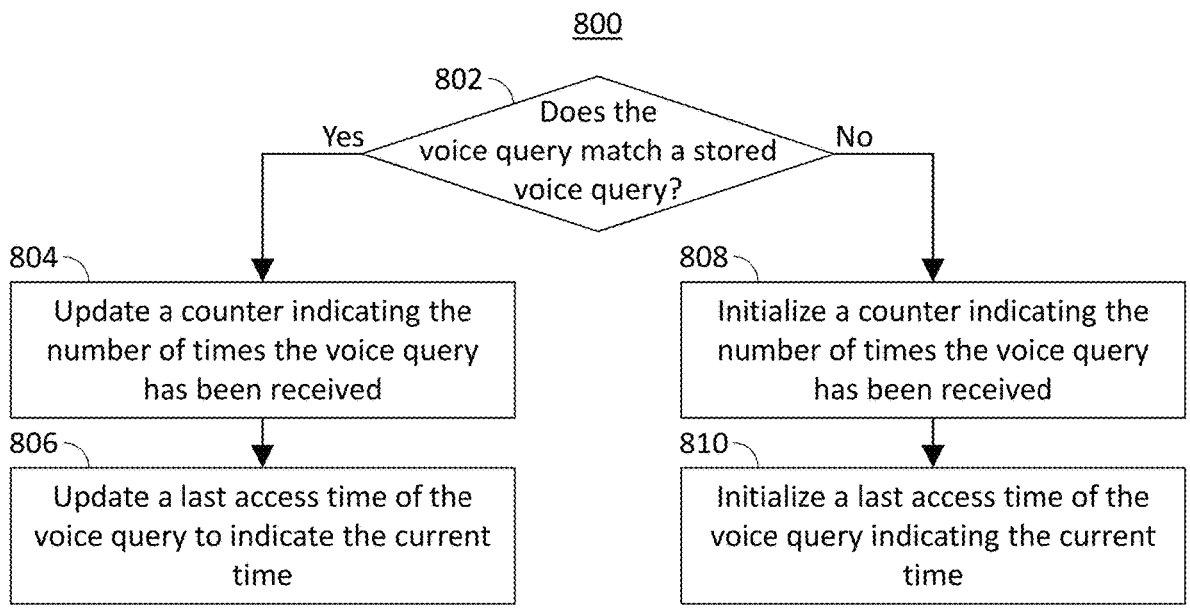
FIG. 8 is a flowchart representing a process for maintaining a table tracking frequency of input of voice queries, in accordance with some embodiments of the disclosure.

FIG. 8 is a flowchart representing an illustrative process 800 for maintaining a table tracking frequency of input of voice queries, in accordance with some embodiments of the disclosure. Process 800 may be implemented on local device control circuitry 408. In addition, one or more actions of process 800 may be incorporated into or combined with one or more actions of any other process or embodiment described herein.

At 802, local device control circuitry 408 determines whether the voice query matches a stored voice query using, for example, any of the processing methods described above in connection with FIGS. 6 and 7. If the voice query matches a stored voice query ("Yes" at 802), then, at 804, local device control circuitry 408 updates a counter indicating the number of times the voice query has been received. For example, the data structure may contain, for each entry, a field containing an integer value corresponding to the number of time the voice query has been received. Local device control circuitry 408 may retrieve the value of the counter from the data structure, increment the value of the counter by one, and write the updated counter value back to the appropriate field in the data structure. At 806, local device control circuitry 408 updates a last access time of the voice query to the indicate the current time. For example, the data structure may contain, for each entry, a field containing a timestamp corresponding to the most recent time at which the particular voice query was received. Local device control circuitry 408 may generate a timestamp corresponding to the current date and time and write the generated timestamp to the appropriate field in the data structure.

If the voice query does not match any stored voice queries ("No" at 802), then, at 808, local device control circuitry 408 initializes a counter indicating the number of times the voice query has been received and sets the value of the counter to one. At 810, local device control circuitry 408 initializes a last access time of the voice query and sets its value to a timestamp representing the current date and time. Local device control circuitry 408 then generates a new entry in the data structure corresponding to the voice query and writes the counter and timestamp to the appropriate fields of the new entry.

The actions or descriptions of FIG. 8 may be used with any other embodiment of this disclosure. In addition, the actions and descriptions described in relation to FIG. 8 may be done in any suitable alternative orders or in parallel to further the purposes of this disclosure.

Figure 9:
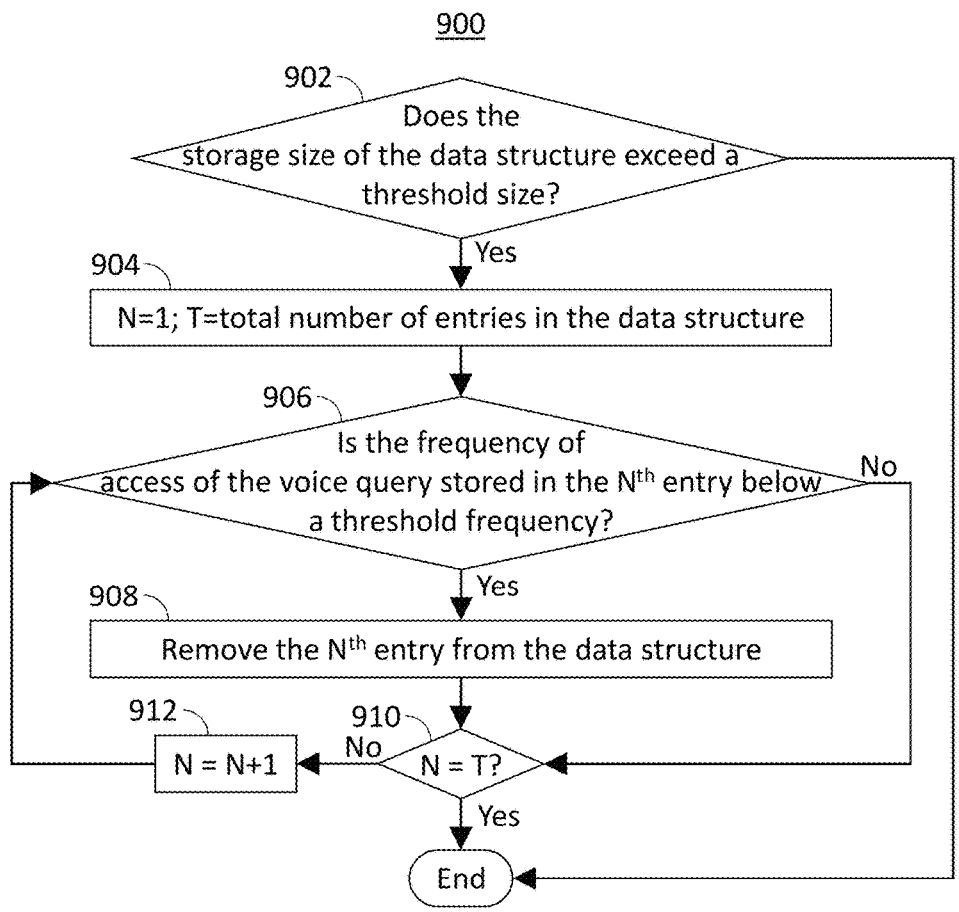
FIG. 9 is a flowchart representing a process for reducing the amount of stored voice queries, in accordance with some embodiments of the disclosure.

FIG. 9 is a flowchart representing an illustrative process 900 for reducing the amount of stored voice queries, in accordance with some embodiments of the disclosure. Process 900 may be implemented on local device control circuitry 408. In addition, one or more actions of process 900 may be incorporated into or combined with one or more actions of any other process or embodiment described herein.

At 902, local device control circuitry 408 determines whether the storage size of the data structure exceeds a threshold size. For example, storage 414 may have a limited storage capacity. In order to prevent the data structure from exceeding the storage capacity of storage 414, local device control circuitry 408 may determine the storage capacity of an unused portion of storage 414. If less than a minimum amount of storage, such as one megabyte, remains unused in storage 414, local device control circuitry 408 may determine that the data structure has exceeded a threshold storage size. Alternatively, the threshold storage size of the data structure may be a static value such as one hundred megabytes, five hundred megabytes, one gigabyte, etc. Local device control circuitry 408 may compare the storage size of the data structure to the static threshold size to determine if the storage size of the data structure exceeds the threshold.

If the storage size of the data structure exceeds the threshold ("Yes" at 902), then, at 904, local device control circuitry 408 initializes a counter variable N, setting its value to one, and a variable T representing the total number of entries in the data structure. At 906, local device control circuitry 408 determines whether the frequency of access of the voice query stored in the $N^{th}$ entry of the data structure is below a threshold frequency. For example, local device control circuitry 408 divides an amount of time between a time at which local device 400 received a first voice query and the current time by the total number of times the voice query stored in the $N^{th}$ entry has been received (e.g., using a counter variable stored in the $N^{th}$ entry). Local device control circuitry 408 may then compare the calculated frequency of the stored voice query with a threshold frequency. If the frequency of access of the voice query stored in the $N^{th}$ entry is below the threshold frequency ("Yes" at 906), then, at 908, local device control circuitry 408 removes the $N^{th}$ entry from the data structure. If the frequency of the access exceeds the threshold frequency ("No" at 906), or after removing the $N^{th}$ entry from the data structure, at 910, local device control circuitry 408 determines whether N is equal to T, meaning the all entries in the data structure have been processed. If N is not equal to T ("No" at 910), then, at 912, local device control circuitry 408 increments the value of N by one, and processing returns to step 906. If N is equal to T ("Yes" at 910), then the process ends.

The actions or descriptions of FIG. 9 may be used with any other embodiment of this disclosure. In addition, the actions and descriptions described in relation to FIG. 9 may be done in any suitable alternative orders or in parallel to further the purposes of this disclosure.

Figure 10:
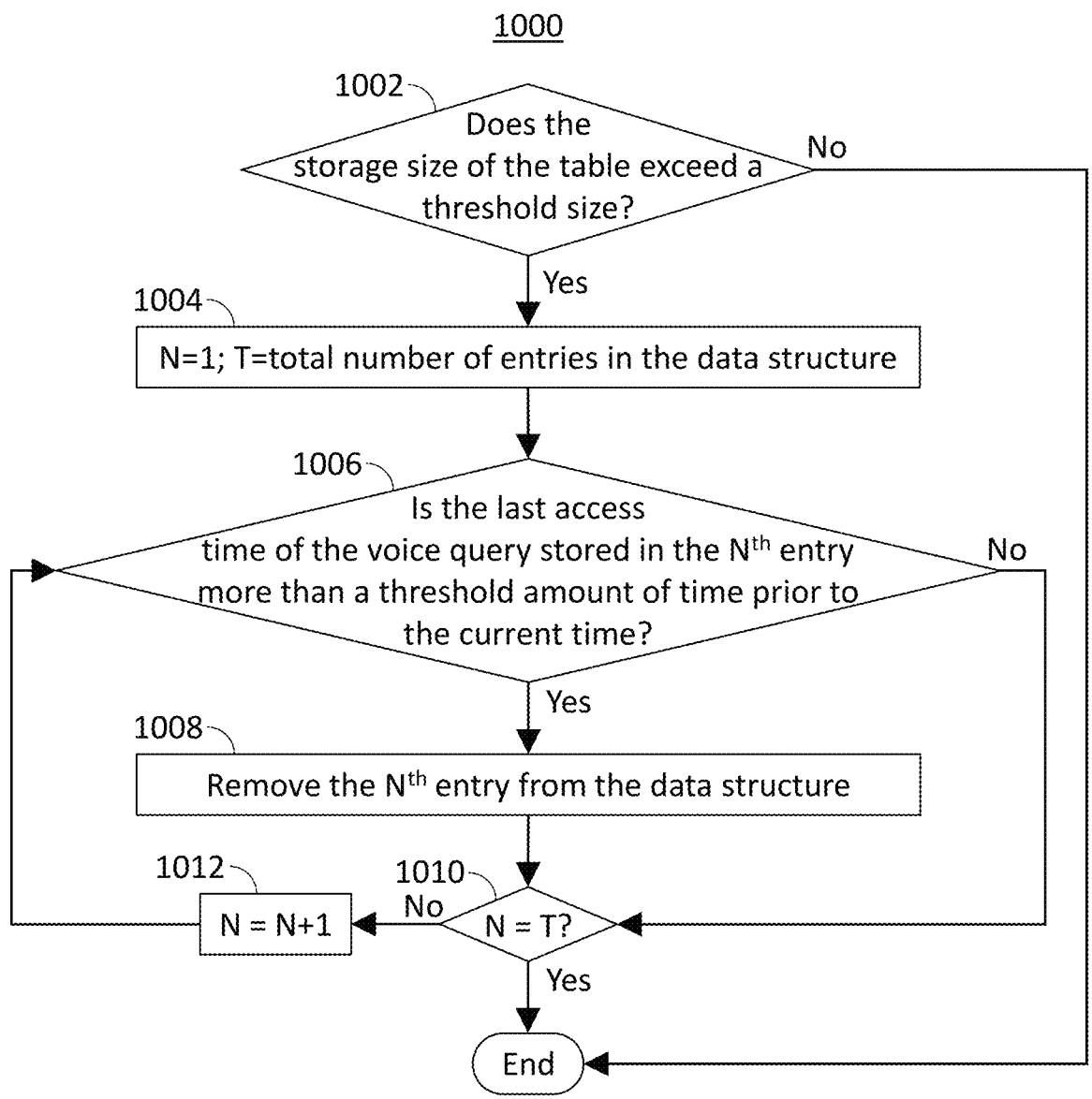
FIG. 10 in a flowchart representing another process for reducing the amount of stored voice queries, in accordance with some embodiments of the disclosure.

FIG. 10 in a flowchart representing another illustrative process 1000 for reducing the amount of stored voice queries, in accordance with some embodiments of the disclosure. Process 1000 may be implemented on local device control circuitry 408. In addition, one or more actions of process 1000 may be incorporated into or combined with one or more actions of any other process or embodiment described herein.

At 1002, local device control circuitry 408 determines whether the storage size of the data structure exceeds a threshold size. This may be accomplished using methods described above in connection with FIG. 9. At 1004, local device control circuitry 408 initializes a counter variable N, settings its value to one, and a variable T representing the total number of entries in the data structure. At 1006, local device control circuitry 408 determines whether the last access time of the voice query stored in the $N^{th}$ entry in the data structure is more than a threshold amount of time prior to the current time. For example, local device control circuitry 408 may retrieve a timestamp corresponding the last access time of the stored voice query from the $N^{th}$ entry in the data structure. Local device control circuitry 408 may convert the timestamp to an integer value, such as a number of seconds from Jan. 1, 1970 ("Epoch Time") or a UTC time code. Local device control circuitry 408 may similarly convert the current time to an integer value. Local device control circuitry 408 then subtracts the integer value representing the last access time from the integer representing the current time. Local device control circuitry 408 may compare the resulting value to a threshold value, performing any necessary conversions to enable the comparison. If the difference is greater than the threshold ("Yes" at 1006), then, at 1008, local device control circuitry 408 removes the $N^{th}$ entry from the data structure. If the difference is less than the threshold value, or after removing the $N^{th}$ entry from the data structure, at 1010, local device control circuitry 408 determines whether N is equal to T, meaning that all the entries in the data structure have been processed. If N is not equal to T ("No" at 1010), then, at 1012, local device control circuitry 408 increments the value of N by one, and processing returns to step 1006. If N is equal to T ("Yes" at 1010), then the process ends.

The actions or descriptions of FIG. 10 may be used with any other embodiment of this disclosure. In addition, the actions and descriptions described in relation to FIG. 10 may be done in suitable alternative orders or in parallel to further the purposes of this disclosure.

The processes described above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for interpreting a voice query, the method comprising:
   receiving, at a local device, a voice query;
   determining an audio characteristic of the voice query;
   accessing a table, stored at the local device, of a plurality of stored voice queries that have been previously received, wherein the table comprises a number of instances that each of the plurality of stored voice queries has been matched with previously received voice queries;
   for each respective stored voice query of the plurality of stored voice queries:
      determining whether an audio characteristic of the respective stored voice query is similar to the audio characteristic of the voice query; and
      in response to determining that the audio characteristic of the respective stored voice query is similar to the audio characteristic of the voice query, adding the respective voice query to a data structure of candidate voice queries;
   comparing the voice query with the candidate voice queries in order of the number of instances for the candidate voice queries;
   identifying, based on the comparing, a candidate voice query that matches the voice query;
   retrieving, from the table, text corresponding to the candidate voice query;
   performing an action corresponding to the text; and
   in response to determining that the data structure of candidate voice queries does not contain a candidate voice query that matches the voice query:
   transmitting the voice query to a remote server for transcription;
   receiving a transcription of the voice query from the remote server;
   storing, in the table, the voice query and the transcription; and
   further comprising:
      determining whether the storage size of the table exceeds a threshold size; and
      in response to determining that the storage size of the table exceeds the threshold size, reducing the amount of data stored in the table;
      wherein reducing the amount of data stored in the table comprises:
         determining a frequency with which each stored voice query is received; and
         in response to determining that the frequency of a particular stored voice query is below a threshold frequency, removing the particular stored voice query from the table.

2. The method of claim 1, wherein a plurality of audio files is stored at the local device for a first stored voice query of the plurality of stored voice queries, the method further comprising: accessing the plurality of audio files; generating, based on the plurality of audio files, average audio characteristics for the first stored voice query; and wherein the audio characteristic of the voice query is compared with the average audio characteristics for the first stored voice query.

3. The method of claim 1, wherein determining whether an audio characteristic of a respective stored voice query is similar to the audio characteristic of the voice query comprises: determining a duration of the voice query; and retrieving a plurality of stored voice queries having a duration within a threshold amount of the duration of the voice query.

4. The method of claim 1, wherein determining whether an audio characteristic of a respective stored voice query is similar to the audio characteristic of the voice query comprises: performing audio analysis of the voice query; determining, based on the audio analysis, an audio characteristic of the voice query; accessing metadata describing audio characteristics of a plurality of stored voice queries; and selecting, from the plurality of stored voice queries, a subset of stored voice queries based on the audio characteristic of the voice query and the metadata describing audio characteristics of the plurality of stored voice queries.

5. The method of claim 4, wherein the audio characteristic of the voice query includes at least one of a duration, a tone, a rhythm, a cadence, or an accent.

6. The method of claim 1, further comprising retrieving a plurality of stored voice queries that are most frequently received.

7. The method of claim 1, further comprising: updating a counter for the voice query, the counter indicating the number of times the voice query has been received; and updating a last access time of the voice query to indicate a current time.

8. The method of claim 1, wherein reducing the amount of data stored in the table comprises:
   determining a last access time of each stored voice query; and
   in response to determining that the last access time of a particular stored voice query is more than a threshold amount of time prior to a current time, removing the particular stored voice query from the table.

9. A system for interpreting a voice query, the system comprising:
   memory; and
   control circuitry configured to:
      receive a voice query;
      determine an audio characteristic of the voice query;
      access a table, stored in the memory, of a plurality of stored voice queries that have been previously received, wherein the table comprises a number of instances that each of the plurality of stored voice queries has been matched with previously received voice queries;
      for each respective stored voice query of the plurality of stored voice queries:
         determine whether an audio characteristic of the respective stored voice query is similar to the audio characteristic of the voice query; and
         in response to determining that the audio characteristic of the respective stored voice query is similar to the audio characteristic of the voice query, adding the respective stored voice query to a data structure of candidate voice queries;
      compare the voice query with the candidate voice queries in order of the number of instances for the candidate voice queries;
      identify, based on the comparing, a candidate voice query that matches the voice query;
      retrieve, from the table, text corresponding to the candidate voice query;
      perform an action corresponding to the text and
      in response to determining that the data structure of candidate voice queries does not contain a candidate voice query that matches the voice query:
         transmit the voice query to a remote server for transcription;
         receive a transcription of the voice query from the remote server; and
         store, in the table, the voice query and the transcription;
   wherein the control circuitry is further configured to:
      determine whether the storage size of the table exceeds a threshold size; and
      in response to determining that the storage size of the table exceeds the threshold size, reduce the amount of data stored in the table;
   wherein the control circuitry configured to reduce the amount of data stored in the table is further configured to:
      determine a frequency with which each stored voice query is received; and
      in response to determining that the frequency of a particular stored voice query is below a threshold frequency, remove the particular stored voice query from the table.

10. The system of claim 9, wherein a plurality of audio files is stored in the memory for a first stored voice query of the plurality of stored voice queries, and wherein the control circuitry is further configured to: access the plurality of audio files; generate, based on the plurality of audio files, average audio characteristics for the first stored voice query; and wherein the control circuitry is configured to compare the audio characteristic of the voice query with the average audio characteristics for the first stored voice query.

11. The system of claim 9, wherein the control circuitry is further configured to: update a counter for the voice query, the counter indicating the number of times the voice query has been received; and update a last access time of the voice query to indicate a current time.

12. The system of claim 9, wherein the control circuitry configured to reduce the amount of data stored in the table is further configured to: determine a last access time of each stored voice query; and in response to determining that the last access time of a particular stored voice query is more than a threshold amount of time prior to a current time, remove the particular stored voice query from the table.

13. The system of claim 9, wherein the control circuitry configured to determine whether an audio characteristic of a respective stored voice query is similar to the audio characteristic of the voice query is further configured to: determine a duration of the voice query; and retrieve a plurality of stored voice queries having a duration within a threshold amount of the duration of the voice query.

14. The system of claim 9, wherein the control circuitry configured to determine whether an audio characteristic of a respective stored voice query is similar to the audio characteristic of the voice query is further configured to: perform audio analysis of the voice query; determine, based on the audio analysis, an audio characteristic of the voice query; access metadata describing audio characteristics of a plurality of stored voice queries; and select, from the plurality of stored voice queries, a subset of stored voice queries based on the audio characteristic of the voice query and the metadata describing audio characteristics of the plurality of stored voice queries.

15. The system of claim 14, wherein the audio characteristic of the voice query includes at least one of a duration, a tone, a rhythm, a cadence, or an accent.

16. The system of claim 9, wherein the control circuitry is further configured to retrieve a plurality of stored voice queries that are most frequently received.

* * * * *